Figure 1:
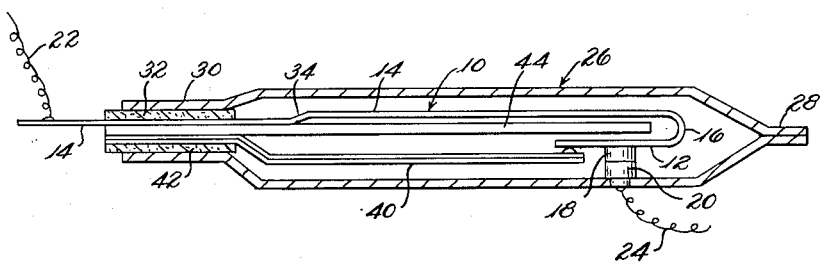

Aug. 1, 1961  H. E. WEBKING  2,994,754
MODIFIED ACTION THERMOSTAT
Filed April 7, 1958

INVENTOR.
HENRY E. LIEBKING
BY
Oldham & Oldham
ATTYS.

United States Patent Office 2,994,754
Patented Aug. 1, 1961

2,994,754
MODIFIED ACTION THERMOSTAT
Henry E. Webking, Cuyahoga Falls, Ohio, assignor to Thermal Engineering & Design Company, Akron, Ohio, a partnership
Filed Apr. 7, 1958, Ser. No. 726,978
5 Claims. (Cl. 200—122)

This invention relates to thermostatic switches employed to break a circuit when the switch or its surroundings reaches a certain temperature and to re-establish the circuit when the temperature drops below the critical temperature, or to intermittently interrupt a circuit when a predetermined electric current has been flowing for a predetermined period of time.

Heretofore it has been the practice to employ as a part of the circuit to be controlled a strip of bimetal material carrying a movable contact which made contact with a stationary contact in one position of the bimetal strip and released contact in a second position of the strip, the positions of the strip being controlled by temperature conditions. The time cycle of such a thermostat switch depended upon the rate of heating and cooling of the bimetal strip.

It is the object of the present invention to provide a small thermostat switch in which a much slower cycle of make and break movements is provided than has heretofore been accomplished in similar structures. Established safety standards in the electric motor and other industries require locked rotor and heating abuse tests for approximately 500 (18 days×24 hours actually) continuous hours, during which period the motor or appliance to be protected by a thermal overload device must not exceed such established temperature limits. To accomplish the above result the "make" and "break" movements of the contact points must be sufficiently infrequent and "clear" without arcing or chattering so that the contact point life and calibration temperature limits are maintained for such very extended periods of time with small structures and with light contacts.

It is the object of the present invention to provide a small thermostat switch which may be actuated by temperature or electric current or various combinations of both and which operates at a much slower cycle rate of make and break than has heretofore been accomplished.

Another object of this invention is to provide a thermostat as a temperature limit control for an electric motor, and which will both make and break a heavy amperage current for up to ⅓ and ½ horse power 115 volt A.C. electric motors, for extended periods of time and for a large accumulative number of cycles.

Another object of this invention is to provide a thermostat for temperature limit control of electric motors which will allow the motor to restart a load equal to the maximum rating of the motor after the thermostat has broken and remade the circuit.

Another object of the invention is to provide a thermostat switch in which all or a portion of the current flowing through the closed switch is shunted about the bimetal strip.

A further object of the invention is to provide a switch in which the make and break contacts are supported independently of the bimetal strip.

Another object of the invention is the provision of a switch operated by an electric overload and including a spring metal strip of electric current resistant material and mounting a contact and characterized by the portion of the strip lying to one side of the contact carrying electric current and the portion lying to the other side not carrying electric current but engaged by a bimetal strip.

The foregoing objects, and other objects which will become apparent as the description proceeds, are achieved by the provision of a switch operated by an overload of electric current including a fixed contact button, a spring metal strip of electric current resistant material, a contact mounted on the metal strip intermediate the ends thereof, means supporting one end of the strip and resiliently holding the contact in engagement with the contact button, electrical connections to the supported end of the strip and to the contact button, and bimetal means engaging the unsupported end of the metal strip and heated by the metal strip to lift the contact off the contact button upon the passage of overload currents through the metal strip.

Figure 2:
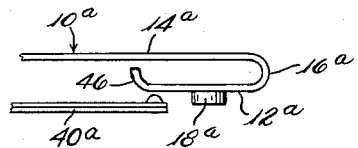

In the drawings,

FIG. 1 is a longitudinal sectional view of a best known embodiment of the invention; and FIG. 2 is a view of a portion of the apparatus of FIG. 1 and illustrating a modification thereof.

More specifically referring to the drawings, a spring metal strip 10 of material is provided which is resistant to the flow of electric current. In other words, the metal strip 10 heats up from the flow of electric current. The cross-sectional area of the strip is carefully selected so that it will carry a normal operating current for a motor, for example, without getting more than warm. But should the motor be overloaded, or get into a stopped rotor condition, a great deal more current is drawn through the metal strip 10 and it will quickly get very hot.

A typical metal strip material which has been found to have the necessary characteristics of springiness, corrosion resistance and electrical resistance is that sold commercially as "Inconel" and comprising an alloy of approximately 80% nickel, 14% chromium, and 6% iron.

The metal strip 10 is formed of a flattened J-shape in side elevation to provide a short leg 12 closely parallel to but spaced from the long leg 14. The legs 12 and 14 are joined on a short radius curve 16. It has been discovered that when a metal strip of Inconel more than about .015" thick is bent as described, that it may break in the region of the sharp radius 16. Hence in switches adapted to carry heavy current, for example, 30 to 50 amperes, two strips of Inconel are used together, each .010" thick, for example. A contact 18 is secured to about the midpoint of short leg 12 and is adapted to removably engage with contact button 20. An electric lead 22 is secured to the end of the long leg 14, and an electric lead 24 is secured to the contact button 20.

In order to support the metal strip 10 and the contact button 20 preferably a metal case, indicated as a whole by the numeral 26, is provided. The case 26 is closed at one end, as at 28, and the other end 30 is crimped down around the end of the leg 14 to support the metal strip 10 in cantilever fashion in a position extending into the case. An insulating sleeve 32 of plastic impregnated glass fabric, for example, is provided between the case and the metal strip. To facilitate fitting the metal strip 10 into the case the strip may be provided with an offset 34 as shown.

The contact button 20 is mounted on the case by welding.

Likewise provided in the combination is a bimetal strip 40 having one end surrounded by an insulating sleeve 42, like sleeve 32, and crimped in cantilever support in the case. The other end of the bimetal extends into the case and into engagement with the underside of the end of the short leg 12.

In the operation of the switch described, it is placed in series with a motor to be protected, for example, by insertion either into an insulated spacing provided in or between the motor windings or attached to the surface of the motor windings themselves, electric leads 22 and 24 facilitating such a connection. Thus, electric current passing to the motor must flow via lead 22, through metal strip 10, contact 18 and contact button 20 and out lead 24. Under normal electric loads the strip 10 becomes warm, but should an overload occur, such as a motor stoppage, the combination conductor-heater strip 10 becomes hot very quickly. When the strip 10 becomes hot the bimetal 40 is heated by radiation from the strip 10 and after a short time delay of a few seconds operates to move contact 18 off contact button 20 to break the circuit. The amount of time delay in the switch is controlled in several ways. First, a layer 44 of heat insulating material of a selected thickness may be interposed between the metal strip 10 and the bimetal 40. Again, a selective amount of tension on the strip 10 holding the contact 18 against contact button 20 can be built into the switch. The amount of tension on the bimetal and built into the switch can be changed. The position of the switch in relation to the motor and the amount of heat flow into the case 26 and radiation of heat from the case to the bimetal is a factor. Reference has already been made to the cross-sectional area of the strip 10, and it will be seen that the same is true of the bimetal, such cross section and the type of bimetal being factors in the strength and speed of its movement.

All factors are correlated and appropriately calibrated to give the best protective action in a selected operation.

A particular advantage of the switch structure described is that there is no flow of electric current from the contact 18 towards the end of the short leg 12 of the strip 10. Thus, the end of the strip is cold against which the bimetal engages so that the operation of the bimetal and the make and break of contact 18 and contact button 20 is much more positive than if the bimetal engaged with the hot portion of the strip 10 which tends to bow or arch more freely. It has also been discovered that the reverse bend of the metal conductor-heater strip 10 reduces its lineal expansion effect after heating. This reduction in lineal expansion prevents moving the contact 18 out of alignment with the fixed contact button 20 which would destroy pre-set calibration accuracy. With the structure described the heating effect on the "make" on heavy electric currents is reduced and "bounce" of the contact 18 on contact button 20 with attendant arcing on the "make" is either materially reduced or eliminated.

Perhaps it should be stated that in thermostats or switches of the type described that it is possible to shunt part of the electric current through the bimetal but such constructions are preferably avoided in the practice of the invention.

In the embodiment of the invention of FIG. 2 the short leg 12a of the metal strip 10a which extends back beyond the contact 18a is bent upwardly at 46 towards the long leg 14a but is spaced therefrom as shown. Thus, should the short radius curve 16a weaken and bend in use the portion 46 will contact the leg 14a to prevent excessive displacement of contact 18a.

While in accord with the patent statutes one best known embodiment of the invention has been illustrated and described, it is to be specifically understood that the invention is not to be limited thereto or thereby but is of the scope defined in the appended claims.

What is claimed is:

1. A heat operated switch including a spring metal strip of homogeneous resistance material mounted rigidly near one end thereof and supporting the other end in cantilever fashion, said other end being bent back on itself with a short radius turn to provide a short leg lying substantiall parallel to said other end, a contact on the short leg, a fixed contact button with which the contact engages, electrical connections to the contact button and the said one end of the metal strip, and a bimetal strip mounted near said one end of said spring metal strip in insulated relation thereon and extending parallel to but spaced from the metal strip and adapted to engage the end of the short leg thereof beyond the contact thereon to lift the contact off of the contact button upon heating of the bimetal strip in a calibrated amount.

2. A switch operated by an overload of electric current including a spring metal strip of homogeneous electric current resistant material and having a flattened J-shape, means mounting the strip near the end of the long leg of the J and supporting the remainder of the strip in cantilever fashion, a contact on the outside of the short leg of the J spaced from the free end thereof, a fixed contact button normally electrically engaging the contact electric connections to the long leg of the strip and to the contact button so that the metal strip is heated by the passage of electric current, a bimetal strip supported near the mounting means in insulated relation to said spring metal strip and extending in cantilever fashion substantially parallel to the long leg of the metal strip and into engagement with the contact side of the end of the short leg of the metal strip at a position closer to the free end of said strip than said contact thereon whereby current overloads carried by the metal strip cause such heating of the metal strip as to heat and actuate the bimetal strip by radiation to lift the contact off of the contact button.

3. The combination defined in claim 2 wherein an offset is provided in the long leg of the metal strip and a metal case surrounds the entire switch.

4. A thermostat including an elongate tubular metal case connected to one terminal of a circuit, a current carrying single piece spring metal strip of high resistance material having one end mounted in electrically insulated relation to one end of the case and extending therebeyond for connection to the other terminal of the circuit for heating it by passage of current therealong and its other free end extending axially of the case, said strip having a return bend therein near its free end, a contact conductively connected to and on the case, a contact button on the free end of said strip beyond the reverse bend thereof from its mounted end for make and break contact with the contact of the case, means for passing a current along said strip between its mounted end and its contact button to heat the strip, a bimetal strip mounted on the case in insulated relation thereto and having a free end extending along the case and movable by temperature change into and out of contact with the spring metal strip at a point on the free end beyond its return bend of the high resistance strip and at a position along said high resistance strip from its support on said case electrically more remote than said contact button.

5. A thermostat including an elongate tubular metal case connected to one terminal of a circuit, a current carrying single piece spring metal strip of high resistance material having one end mounted in electrically insulated relation to one end of the case and its other free end extending axially of the case, said strip having a return bend therein near its free end, a contact conductively connected to the case and on the case and extending therebeyond for connection to the other terminal of a circuit for heating it by passage of current therealong, a contact button on the free end of said strip beyond the reverse bend thereof from its mounted end for make and break contact with the contact of the case, means for passing a current along said strip between its mounted end and its contact button to heat the strip, a bimetal strip mounted on the same end of the case in insulated relation thereto and having a free end extending along the case and movable by temperature change into and out of contact with the spring metal strip at a point on the free end of the high resistance strip beyond its return bend and at a position along said high resistance strip from its support on said case electrically more remote than said contact button.

(References on following page)

References Cited in the file of this patent

UNITED STATES PATENTS

| | | | |
|---|---|---|---|
| 1,775,553 | Daniker | Sept. 9, | 1930 |
| 2,199,638 | Lee | May 7, | 1940 |
| 2,214,843 | Turner | Sept. 17, | 1940 |
| 2,421,538 | Clark | June 3, | 1947 |
| 2,535,969 | Tramontini | Dec. 26, | 1950 |
| 2,747,054 | Valverde | May 22, | 1956 |
| 2,792,474 | Dales | May 14, | 1957 |
| 2,824,933 | Shanley | Feb. 25, | 1958 |

FOREIGN PATENTS

| | | | |
|---|---|---|---|
| 206,386 | Great Britain | Nov. 8, | 1923 |